United States Patent

[11] 3,620,700

[72] Inventors Warren G. Schlinger
  Pasadena;
  William L. Slater, La Habra; Roger M.
  Dille, La Habra; Joseph P. Tassoney,
  Whittier, all of Calif.
[21] Appl. No. 850,404
[22] Filed Aug. 15, 1969
[45] Patented Nov. 16, 1971
[73] Assignee Texaco Inc.
  New York, N.Y.
  Continuation-in-part of application Ser. No.
  787,190, Dec. 26, 1968, Continuation-in-
  part of application Ser. No. 787,191, Dec.
  26, 1968. This application Aug. 15, 1969,
  Ser. No. 850,404

[54] RECOVERY OF ENTRAINED CARBON IN SYNTHESIS GAS
  9 Claims, 1 Drawing Fig.

[52] U.S. Cl. .................................................. 48/215,
  23/209.9, 210/40, 252/373
[51] Int. Cl. ....................................................B01d 15/00,
  C01b 2/14, C02b 1/14

[50] Field of Search.................................... 48/215,
  212, 196, 206, 197; 252/373, 376; 210/21, 42, 46,
  51, 54, 40; 23/209.9, 212 A; 55/22

[56] References Cited
UNITED STATES PATENTS
2,864,677  12/1958  Eastman et al. ............. 48/206
3,069,251  12/1962  Eastman et al. ............. 48/215

Primary Examiner—Joseph Scovronek
Attorneys—K. E. Kavanagh and Thomas H. Whaley

ABSTRACT: Free carbon soot entrained in the product gas of a free-flow synthesis gas generator is recovered in a sedimentation vessel as part of a thickened dispersion of solids in water from which clear supernatant water is easily separated by supplying particulate petroleum coke to the sedimentation vessel or to the reaction zone of said gas generator as a portion of the fuel, or by mixing the carbon soot-water dispersion in the sedimentation vessel with a thickened water slurry of unconverted petroleum coke such as produced by quenching in water the product gas of a second free-flow synthesis gas generator in which the fuel comprises raw particulate petroleum coke and the thickened underflow from said sedimentation vessel.

PATENTED NOV 16 1971 3,620,700
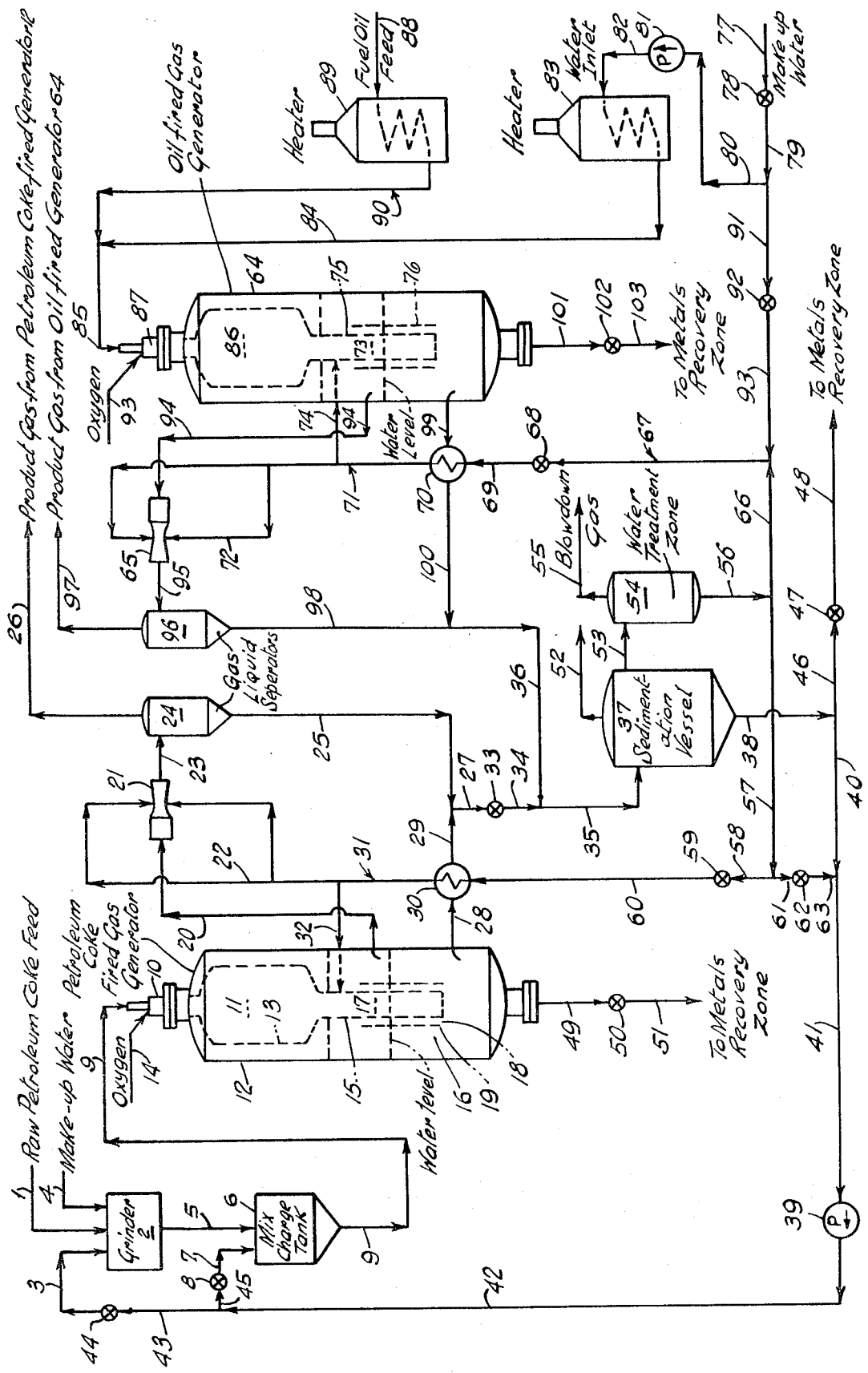

RECOVERY OF ENTRAINED CARBON IN SYNTHESIS GAS

This application is a continuation-in-part of our copending applications Ser. Nos. 787,190 and 787,191, filed on Dec. 26, 1968.

BACKGROUND OF THE INVENTION

1. Field of the Invention

This invention relates to the production of synthesis gas. More particularly, it relates to an improved process for recovering carbon particles from the effluent gas from a synthesis gas generator.

The parent case, Ser. No. 787,191, pertains to the production of synthesis gas from a slurry of particulate solid carboniferous fuel, e.g., petroleum coke, coke from bituminous coal, coal, oil shale, tar sands, pitch, or mixtures of said solid fuels in water or in a hydrocarbon liquid fuel. A pumpable slurry containing 1 to 60 weight percent of ground solid carboniferous fuel in petroleum oil or 25 to 55 weight percent of ground solid carboniferous fuel in water at a relatively low discharge velocity in the range of 5 to 50 feet per second is mixed with a stream of oxidizing gas at a relatively high discharge velocity in the range of 200 feet per second to sonic velocity at the burner tip to form an atomized dispersion of water, hydrocarbon liquid fuel, oxidizing gas and particulate solid carboniferous fuel. Under synthesis gas-generating conditions the atomized dispersion is reacted to produce a gaseous mixture of hydrogen and carbon monoxide. By said process, slurry feeds of low-cost solid carboniferous fuels may be gasified without being preheated. In Ser. No. 787,190 the amount of particulate solid carboniferous fuel in a pumpable slurry was increased to 75 weight percent and the particle size of the solid fuel was increased to pass through a 12 mesh screen by the addition of 2 to 10 weight percent of carbon soot as produced, for example, by the partial oxidation of crude oil.

2. Description of the Prior Art

Synthesis gas, a mixture of carbon monoxide and hydrogen, is commonly made by the partial oxidation of liquid hydrocarbon fuels. The raw synthesis gas leaving the gas generator comprises principally CO and $H_2$ together with minor amounts of free carbon soot. Free carbon soot may be removed from the effluent gaseous stream by contacting the gas with water in a quenching and scrubbing zone. The carbon soot particles absorb water, forming a carbon-water slurry.

To produce synthesis gas economically, it is important to separate clear water from the carbon-water slurry for reuse. However, the fine particle size of the carbon soot makes ordinary filtration methods difficult and makes gravity separation uneconomical due to excessive settling times. Further, liquid hydrocarbon extraction procedures for recovering particulate carbon soot are complex. By the process of our invention, separation of carbon soot from the quench and scrubbing water is easily accomplished.

Synthesis gas is important commercially as a source of hydrogen for use in hydrogenation reactions, and also as a source of feed gas for the synthesis of hydrocarbons, oxygen containing organic compounds, or ammonia.

SUMMARY

Entrained in the produce gas of a free-flow, noncatalytic, unpacked, oil-fired synthesis gas generator is about 0.5 to 10 weight percent of free carbon soot (basis carbon in the oil feed). The free carbon soot may be recovered in quench water as a pumpable slurry containing 0.5 to about 3 weight percent of solids. Until now, however, the hydrophilic nature of the carbon soot and its small size (about 70 millimicrons) made the settling rate of the carbon soot in water unduly lengthy and the solids concentration low.

It was unexpectedly found that by the process of our invention when particulate petroleum coke is added to a dispersion of carbon soot in water, the settling rate of the carbon particles is accelerated and the concentration of solids in the slurry is increased. Dry particulate petroleum coke may be added to a carbon soot-water dispersion in the amount of about 0.1 to 5.0 parts by weight of petroleum coke or more to 1 part by weight of carbon soot, thereby substantially increasing the settling rate.

In another embodiment of our invention, unconverted petroleum coke is introduced into the process when raw particulate petroleum coke is burned along with a liquid hydrocarbon fuel in a free-flow, unpacked, noncatalytic synthesis gas generator or in still another embodiment of the invention the raw particulate petroleum coke is burned in a separate free-flow gas generator. For example, both of the aforesaid fuels may be burned in the same gas generator to produce a product gas that contains a mixture of free carbon soot and unconverted particulate petroleum coke thereby promoting rapid settling of the mixed solid particles in the quench water. Or, the liquid hydrocarbon fuel and the petroleum coke may be burned in separate gas generators so that free carbon soot is entrained in the product gas stream leaving the gas generator burning liquid hydrocarbon fuel and is scrubbed from the product gas with water, forming a dispersion of soot in water. Similarly, coke is entrained in the product gas stream leaving a second gas generator and is scrubbed from the product gas stream with water forming a dispersion of unconverted particulate petroleum coke in water. The two dispersions are mixed together in a liquid-solid separating zone thereby substantially decreasing the time that it takes for the solids in the dispersion to settle by gravity, forming a clear supernatant water layer, i.e., settling rate is increased.

It is therefore a principal object of the present invention to improve the quality of the synthesis gas produced by the continuous partial oxidation process by recovering substantially all of the free carbon soot or unconverted petroleum coke in the product gas as a fast settling dispersion of solid particles in water.

Another object of the invention is to economically recover and recycle as a portion of the feed to a synthesis gas generator, substantially all of the free carbon soot and unconverted particulate petroleum coke entrained in the product gas streams from one or two synthesis gas generators.

These and other objects and advantages of the invention will be apparent from the following drawings wherein:

The FIGURE is a general flow diagram of one embodiment of the process in which fuel oil is fed to one free-flow noncatalytic synthesis gas generator and a water slurry of petroleum coke is fed to another.

DESCRIPTION OF THE INVENTION

This is an improved process for recovering free carbon soot entrained in the gaseous effluent from the reaction zone of a free-flow unpacked noncatalytic synthesis gas generator. The gaseous effluent is scrubbed with water in a gas-liquid contacting zone thereby forming a dispersion of free carbon soot in water, and substantially solids-free synthesis gas is thereby separated. The dispersion of free carbon soot is introduced into a liquid-solids separating zone such as a sedimentation vessel to which particulate petroleum coke is also added. A thickened slurry of petroleum coke, free carbon soot and water settles to the bottom of the sedimentation vessel fairly rapidly by gravity, and a clear supernatant water layer forms on top.

While a minimum of about 0.10 parts by weight of particulate petroleum coke per part by weight of free carbon soot will substantially increase the settling rate, a ratio of about 0.5 to 5 parts by weight of particulate petroleum coke per part by weight of free carbon soot is preferred. Ratios that include still higher amounts of petroleum coke will also work.

The particulate petroleum coke may be mixed with the free carbon soot by any suitable means, such as:

1  Dispersing petroleum coke having a particle size in the range of about 50 to 325 mesh (U.S. Standard Sieve Size) in a dispersion of free carbon soot in water thereby forming a thickened slurry of carbon soot, particulate petroleum coke and water, and a layer of clear supernatant water. If desired, synthetic detergents in general, i.e., alkylbenzene sulfonates, may be added in an amount in the range of about 0.1 to 1 weight percent to help disperse the petroleum coke;

2. Burning a feedstream of particulate petroleum coke and a feedstream of liquid hydrocarbon fuel in separate, free-flow, unpacked, noncatalytic, synthesis gas generators, scrubbing the solids from each product gas stream in a separate gas-liquid contacting zone thereby cooling said product gas streams and forming a dispersion of unconverted particulate petroleum coke in water and a separate dispersion of free carbon soot in water, and mixing together said dispersions in a sedimentation vessel, thereby effecting rapid settling of the solid particles and forming an underflow comprising a thickened slurry of free carbon soot, unconverted particulate petroleum coke and water, and an overflow of clear supernatant water; and, 3. Burning separate or combined feedstreams of a particulate petroleum coke slurry and a liquid hydrocarbon fuel in the same free-flow, unpacked, noncatalytic synthesis gas generator to produce a product gas stream containing a mixture of solid particles consisting of free carbon soot and unconverted particulate petroleum coke, scrubbing substantially all of said solid particles from said product gas stream with water in a gas-liquid contacting zone, thereby forming a dispersion of free carbon soot and unconverted particulate petroleum coke in water, introducing said dispersion into a liquid-solids separation zone as for example a sedimentation vessel where a thickened slurry of free carbon soot, unconverted particulate petroleum coke and water settles by gravity to the bottom and a clear supernatant water layer forms at the top.

Synthesis gas, principally comprising mixtures of hydrogen and carbon monoxide, is produced in accordance with the present invention by reacting such fuels as liquid hydorcarbon and particulate petroleum coke with an oxygen-rich gas and optionally with steam in the reaction zone of a free-flow synthesis gas generator at an autogenously maintained temperature within the range of about 1,700° to 3,500° F. and a pressure in the range of 1 to 350 atmospheres.

The synthesis gas generator in our process consists of a compact, unpacked, free-flow, noncatalytic, refractory lined steel pressure vessel of the type described in U.S. Pat. No. 2,809,104 issued to D.M. Strasser et al., which patent is incorporated herewith by reference.

The oxygen-rich gas may be selected from the group consisting of air, oxygen-enriched air (40 mole % $O_2$ and higher), and preferably substantially pure oxygen (99.5 mole % $O_2$ and higher).

Preheating of the reactants is optional; but generally desirable. For example, a hydrocarbon oil and steam may be preheated to a temperature in the range of about 100° to 700° F. and the oxygen may be preheated to a temperature in the range of about 100° to 750° F.

The product gas stream comprises principally hydrogen and carbon monoxide and may contain relatively small amounts of water vapor, carbon dioxide, hydrogen sulfide, argon, nitrogen and methane. In addition, entrained free carbon soot is present in the product gas streams from gas generators burning liquid hydrocarbon fuels and unconverted particulate petroleum coke is present in the product gas streams when the fuel is petroleum coke.

A wide variety of liquid hydrocarbon fuels are suitable as feedstocks for the partial oxidation process, including: various petroleum distillates and residue, naphtha, gas oil, residual fuel, reduced crude, fuel oil, whole crude, coal tar oil, shale oil and tar sand oil. Slurries of solid carbonaceous feedstocks which produce carbon soot upon combustion i.e., lignite, bituminous and anthracite coals in water or liquid hydrocarbons are also suitable and are included herewith as within the scope of the definition for liquid hydrocarbon fuels.

It is normal to produce from liquid hydrocarbon fuels by partial oxidation about 0.5 to 3 weight percent of free carbon soot (basis carbon in the liquid hydrocarbon fuel), since this conversion level is near the most economical level. The free carbon soot is produced in the reaction zone of the gas generator for example, by cracking liquid hydrocarbon fuels. Carbon soot will prevent damage to the refractory lining in the generator by scavenging the vanadium and nickel and other heavy metal constituents which are present as ash components in residual oils. With heavy crude or fuel oils the operation is adjusted to leave about 2 to 3 by weight percent of the carbon in the feed oil as free carbon soot in the product gas. With lighter distillate oils, progressively lower carbon soot yields are taken.

The amount of soot in the product gas may be controlled primarily by regulating the free oxygen to carbon ratio (O/C, atom/atom) in the range of 0.7 to 1.5 atoms of oxygen per atom of carbon in the fuel and to some extent by regulating the ratio of $H_2O$ to hydrocarbon fuel in the range of 0.2 to 3.0 pound of $H_2O$ per pound of oil. At a constant oil feed rate, the entire operating range of 1 percent to 4 percent soot yield may be obtained by only a 6 percent change in the oxygen feed rate. $H_2O$ is principally introduced into the reaction zone to help control the reaction temperature, as a dispersant of the fuel fed to the reaction zone, and as a reactant to increase the relative amount of hydrogen produced.

The free carbon soot leaving the reaction zone entrained in the stream of product gas has some unique properties. It is both hydrophilic and oleophilic. It is easily dispersed in water and has a high surface area. For example, the specific surface area of the free carbon soot, as determined by nitrogen absorption, ranges from 100 to 1,200 square meters per gram. The Oil Absorption Number, which is a measurement of the amount of linseed oil required to wet a given weight of carbon soot, ranges from 1.5 to 5 pounds of oil per pound of carbon soot. For further information regarding the test method for determining the Oil Absorption Number see ASTM Method D-281.

Free carbon soot as produced within our process has a particle size in the range of 0.01 to 0.5 microns and commonly has a diameter of about 77 millimicrons. Free carbon soot comprises about 92 to 94 weight percent of carbon and 3 to 5 weight percent of ash. Being formed at high temperatures, it is substantially free from volatile matter.

Petroleum coke on the other hand consists of dehydrogenated and condensed hydrocarbons of high molecular weight in the form of a matrix of considerable physical extent and containing dispersed throughout a very minor amount of petroleum-based asphalticlike compounds. Petroleum coke comprises in weight percent about 83 to 93 C, 0.2 to 2.5 of ash, 3 to 7 of volatiles, and has an Oil Absorption No. of less than 1.0. Raw petroleum coke suitable for use as a starting material in the process of this invention is obtained from an external source such as that produced by the "delayed coking" process for converting heavy residual fuel oil into gasoline, gas oil, and coke. Other suitable petroleum coking processes are available that produce a petroleum coke having a similar structure and chemical analysis. A typical delayed coking process is described in Kirk-Othmer Encyclopedia of Chemical Technology, second Edition, Vol. 15, Inter-Science Publishers 1968, pages 20–23.

In one embodiment of our invention, the hot gaseous effluent from the reaction zone of the synthesis gas generator may be quickly cooled below the reaction temperature to a temperature in the range of 300° to 650° F. by direct quenching in water in a gas-liquid contacting or quenching zone. For example, the cooling water may be contained in a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This also substantially equalizes the pressure in the two zOnes. A concentric draft tube, open on both ends, surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from a carbon recovery zone is normally introduced through a quench ring at the top of the dip leg to cool the metal at that point. Large quantities of steam are generated in the quench vessel and the quench chamber may be likened to a high-output, high-pressure boiler.

The turbulent condition in the quench chamber, caused by the large volumes of gases bubbling up through said annulus space, helps the water to scrub substantially all of the solids from the effluent gas, forming a dispersion of free carbon soot, or unconverted particulate petroleum coke, or a mixture of both in the quench water. Additional steam required for any subsequent shift conversion step may be picked up during quenching. Any residual solids in the cooled and scrubbed product gas leaving the quench chamber may be removed by means of a conventional venturi or jet scrubber, such as described in Perry's Chemical Engineers' Handbook, Fourth Edition, McGraw-Hill Co., 1963, pages 18-55 to 56.

For a detailed description of the quench chamber, reference is made to U.S. Pat. No. 2,896,927, issued to R.E. Nagle et al., which is herewith incorporated by reference.

Alternately, the hot product gas stream from the reaction zone may be partially cooled by indirect heat exchange in a waste heat boiler. The entrained solid particles may be then scrubbed from the carrier gas by contacting and further cooling the effluent stream of product gas with quench water in a gas-liquid contact apparatus, for example, a spray tower, venturi or jet scrubber, bubble plate contactor, packed column, or in a combination of said equipment. For a detailed description of cooling synthesis gas by means of a waste heat boiler and a scrubbing tower, reference is made to U.S. Pat. No. 2,980,523, issued to R.M. Dille et al.

In a liquid-solids separation zone, as previously mentioned, the dispersion of free carbon soot and particulate petroleum coke in water is rapidly separated into clear water and a thickened slurry of free carbon soot and unconverted particulate petroleum coke in water, Although any suitable commercial method for separating water and concentrating solids may be used, e.g., centrifuge, low-cost gravity clarification is preferred. For example, suitable sedimentation vessels are described in Perry's Chemical Engineers' Handbook, Fourth Edition, McGraw-Hill Co., 1963, pages 19-42 to 54.

The term "sedimentation" or "thickening" as used herein generally implies gravitational settling of solid particles that are suspended or dispersed in water, with the removal of the bulk of the water from the dispersion by settling. The clear water produced may be recycled to the gas-liquid contacting zone to cool and scrub the product gas, or it may be used in a ball-mill operation for preparation of makeup slurry comprising raw particulate petroleum coke and water to feed the gas generator. The thickened slurry of free carbon soot and particulate petroleum coke in water may be recycled to the synthesis gas generator as a portion of the feed. Thus, there is substantially no net loss of carbon in the process.

In one embodiment of our invention, 325 to 200 mesh U.S. Standard Sieve Size particulate petroleum coke is added to quench water containing about 0.5 to 3 weight percent of free carbon soot. The amount of particulate petroleum coke that may be added is about 0.1 to 5 parts by weight of petroleum coke for each part by weight of free carbon soot. The mixed free carbon soot and particulate petroleum coke settles to the bottom of a sedimentation vessel, forming a thickened slurry containing about 5 to 35 weight percent of solids and a clear supernatant water layer. The thickened slurry and the clear water are separately removed from the sedimentation vessel and are recycled respectively to the grinder for preparing makeup fuel for the generator and to the quench tank as cooling and scrubbing water. By proper control of the input and output streams, the process may be made continuous.

The preparation and gasification if a free-flow synthesis gas generator of slurries of petroleum coke containing about 1 to 60 weight percent of petroleum coke in petroleum oil and 25 to 55 weight percent of petroleum coke in water is described in commonly assigned copending application Ser. No. 787,191. By the addition of 2 to 10 weight percent soot (basis liquid vehicle) the amount of particulate petroleum coke in the slurry may be increased to 75 weight percent and the particle size of the solid fuel may be increased, as described in commonly assigned copending application Ser. No. 787,190.

Further in our related commonly assigned copending application Ser. No. 844,112, which is also incorporated herewith by reference, the method is described for the gasification of water slurries of petroleum coke containing heavy metal constituents in a refractory lined reaction zone of a free-flow unpacked noncatalytic synthesis gas generator. Attack of said refractory lining by the metals and metal compounds present in said petroleum coke, or their reaction products, is substantially prevented by controlling the feedstreams to the reaction zone so that entrained in the product gas leaving the reaction zone is an amount of unconverted petroleum coke containing unreacted about 8 weight percent or more of the quantity of carbon originally present in the petroleum coke feedstream. A description of the method for dispersing petroleum coke in steam for feed to the reaction zone and the gasification of slurries of petroleum coke without preheat in an annulus-type burner may also be found in the aforesaid copending cases.

DESCRIPTION OF THE DRAWING AND EXAMPLES

A more complete understanding of the invention may be had by reference to the accompanying schematic drawing which shows in detail one embodiment of the previously described process utilizing two synthesis gas generators whose product gas streams respectively contain free carbon soot and unconverted particulate petroleum coke. Since quantities have been assigned to the various streams, the following description of the drawing also serves as example I of the invention.

Although the drawing and example illustrate a preferred embodiment of the process of this invention, it is not intended to limit the invention to the particular apparatus or materials described.

In this example, one synthesis gas generator is oil fired and produces a product gas stream containing free carbon soot. The other synthesis gas generator is fired with a water slurry of particulate petroleum coke and produces a product gas stream containing unconverted particulate petroleum coke. The two product gas streams are separately cooled and scrubbed with quench water. The quench water containing unconverted particulate petroleum coke and the quench waters containing free carbon soot, are mixed together in a sedimentation vessel. Rapid settling of the mixed solid particles is thereby effected, forming a thickened slurry of free carbon soot and unconverted particulate petroleum coke at the bottom of the sedimentation vessel and an over-layer of clear supernatant water.

With reference to the drawing, 508.7 pounds per hour (lbs./hr.) of raw petroleum coke as made by the delayed coking process and having a particle size of 8 mesh (U.S. Standard Sieve Size) is passed through line 1 into grinder 2 where it is mixed with a recycle slurry stream comprising 250 lbs./hr. of water and 20 lbs./hr. of a mixture of equal parts by weight of particulate carbon soot and petroleum coke from line 3 and 62 lbs./hr. of makeup water from line 4. The slurry is ground until 100 weight percent of the petroleum coke passes through a U.S. Standard Sieve of about 200 meshes per square inch. The slurry of water and carbon particles consisting of ground petroleum coke and particulate carbon soot is discharged through line 5 into mix-charge tank 6 where a slurry stream of 220 lbs./hr. of water and 19 lbs./hr. of a mixture of equal parts by weight of particulate carbon soot and petroleum coke from line 7 and control valve 8 are added and the concentration of carbon particles in the slurry feed is adjusted to about 50.7 weight percent solids.

A slurry stream comprising 532 lbs./hr. of water and 548 lbs./hr. of solids is introduced by way of line 9 and burner 10 into the reaction zone 11 of vertical, compact, unpacked, noncatalytic petroleum coke-fired synthesis gas generator 12. Burner 10 may be any suitable means for properly mixing the feedstreams; for example, annulus burner 10 as described in commonly assigned copending application Ser. No. 844,112 which is herewith incorporated by reference. Reaction zone 11 is lined with refractory 13. The slurry feedstream is reacted with a 824.6 lbs./hr. of oxygen-rich gas which is introduced into the reaction zone 11 by way of line 14. An autogenous temperature is maintained in the reaction zone in the range of about 1,700° to 3,500° F., and preferably at 2,450° F., in the example. The pressure in the reaction zone is maintained in the range of about 14.7 to 3,000 p.s.i.g., and preferably at 350 p.s.i.g. in the example.

The hot effluent gas stream from reaction zone 11 is discharged through quench leg 15 into quench water 16 contained in quench chamber 17. The effluent gas is cooled and stripped of most of its entrained unconverted petroleum coke as it rises through the water in annular space 18 between the outside of quench leg 15 and concentric draft tube 19, which surrounds quench leg 15 and which is open at both ends.

The product gas stream leaves quench zone 17 by way of line 20, comprising 1,344 lbs./hr. of synthesis gas, 327 lbs./hr. of water, and a trace of unconverted coke. Substantially all of the remaining entrained unconverted petroleum coke particles and free carbon soot, if any, are removed from the synthesis gas by passing the product gas stream through line 20 and into a standard venturi scrubber 21 where it is further contacted and scrubbed with 3,366 lbs./hr. of water from line 22. 1,344 lbs./hr. of condensed water vapor in the gas stream drops to the bottom and leaves separator 24 by way of line 25 carrying with it any remaining petroleum coke particles entrained in the synthesis gas stream. A product stream comprising 1,344 lbs./hr. of solids-free synthesis gas and 9 lbs./hr. of water are removed by way of line 26 at the top of gas-liquid separator 24 for further use in processes which are not shown in the drawing. Analysis of the product gas is shown in table I.

Water containing a trace of unconverted petroleum coke from the bottom of gas-liquid separator 24 is passed through line 25 and mixed in line 27 with the particulate unconverted petroleum coke-water dispersion comprising 5,726 lbs./hr. of water and 25 lbs./hr. of unconverted petroleum coke which is pumped from the bottom of quench tank 17 by way of lines 28 and 29. By means of heat exchanger 30, the sensible heat in the slurry stream in line 28 is used to heat the stream of scrub water going to venturi 21 by way of lines 31 and 22 and the stream of quench water being recycled to quench tank 17 by way of line 32.

A water dispersion of substantially unconverted particulate petroleum coke comprising 9,410 lbs./hr. of water and 25 lbs./hr. of unconverted petroleum coke in line 27 is passed through pressure reducing valve 33 and lines 34 and 35. A stream of carbon soot-water dispersion in line 36 comprising 5,648 lbs./hr. of water and 14 lbs./hr. or carbon soot from the oil-fired gas generator 64 to be further described is introduced into line 35, and the mixed slurry streams are passed into sedimentation vessel 37.

In sedimentation vessel 37 the unconverted particulate petroleum coke rapidly settles by gravity to the bottom of the vessel carrying with it the free carbon soot. A thickened slurry stream comprising 470 lbs./hr. of water and 39 lbs./hr. of mixed unconverted petroleum coke and free carbon soot may then be removed through line 38 and recycled by means of pump 39 through lines 40 to 43, valve 44, and line 3 into grinder 2. As previously described a portion of the slurry in line 42 may bypass grinder 2 and be directed to mix-charge tank 6 by way of line 45, valve 8, and line 7.

To prevent the accumulation of metals and ash in the system, periodically a portion of the thickened slurry is removed from the bottom of sedimentation vessel 37 and by way of lines 38, 46, valve 47, and line 48 is sent to a metal recovery zone (not shown) along with material from the bottom of quench tank 17, by way of line 49, valve 50, and line 51. Any suitable method for recovering the metal constituents retained by the carbon particles may be employed in the metal recovery zone. If desired, the metal-free carbon particles may be then utilized as a portion of the feed to the petroleum coke-fired synthesis gas generator 12.

Dissolved gases are discharged through line 52 at the top of sedimentation vessel 37 for use as potential fuel gas. 14,597 lbs./hr. of clear supernatant water overflow is withdrawn from vessel 37 through line 53 and is introduced into a conventional water treatment zone 54, such as by treatment with ion exchange resins. Dissolved gases may be released and removed from water treatment zone 54 through line 55.

Clear water is withdrawn from line 56 at the bottom of water treatment zone 54 and may be utilized as follows: 9,333 lbs./hr. is passed through lines 56, 57, 58, valve 59, line 60, heat exchanger 30, and into line 31 where by valving not shown about 5,967 lbs./hr. of the water are recycled by way of line 32 into quench zone 17 of petroleum coke-fired gas generator 12 for cooling, and about 3,366 lbs./hr. of the water is introduced into venturi scrubber 21 by way of line 22; if desired, a portion of the water from line 56 may be used to dilute the carbon-water slurry from line 38 by mixing in line 41 the thickened slurry from sedimentation vessel 37 with water from lines 56, 57, 61, valve 62, and line 63.

Similarly, clear water is withdrawn through line 56 at the bottom of water treatment facility 54 and may be used to provide a portion of the water requirements in the oil-fired gas generator 64 as follows: to provide a portion of the 843 lbs./hr. of hot scrub water in venturi mixer 65 by way of lines 56, 66, 67, valve 68, line 69, heat exchanger 70, and lines 71 and 72, and also to introduce a portion of the 5,443 lbs./hr. of recycle water introduced into quench chamber 73 by way of line 74 at the top of dip leg 75. Concentric draft tube 76 surrounds dip leg 75 and quench chamber 73 is similar in operation as described previously for quench chamber 17.

Makeup water is introduced into the system through line 77, valve 78, and line 79. In this example 228 lbs./hr. of makeup water pass through line 80, pump 81, line 82 and into heater 83 where it is converted into steam. The steam is passed through line 84 and is mixed in line 85 with 417 lbs./hr. of fuel oil at a temperature of 634° F. The mixture of oil and steam is introduced into reaction zone 86 of free-flow, noncatalytic oil-fired synthesis gas generator 64 by means of burner 87, which is similar to the previously described gas generator 11.

The fuel oil is introduced into the system by way of line 88. It is heated to a temperature of about 634° F. by means of heater 89 and then is passed through line 90 into line 85 where it is mixed with steam as previously mentioned in the example, the fuel oil has a gravity of 11° API and a gross heating value of about 18,000 b.t.u./lb.

Further, about 1,039 lbs./hr. of makeup water from line 77, valve 78, lines 79 and 91, valve 92 and line 93 are mixed in line 67 with about 5,247 lbs./hr. of water from lines 56 and 66 to provide the water to venturi scrubber 65 and quench zone 73 as previously described.

The hot product gas from reaction zone 86 is cooled in quench zone 73 in the manner previously described for quench zone 17. The product gas comprises 947 lbs./hr. of synthesis gas, 1,347 lbs./hr. of water and about 0.024 lbs./hr. of free carbon soot. It leaves quench zone 73 by way of line 94 and is introduced into venturi scrubber 65 where it is mixed with the 843 lbs./hr. of water from line 72. The water and gas leave venturi scrubber 65 by way of line 95 and pass into gas-liquid separator 96. Analysis of the product gas leaving gas-liquid separator 96 by way of line 97 is shown in table I. 918 lbs./hr. of water containing about 0.024 lbs./hr. of free carbon soot leave gas-liquid separator 96 by way of line 98 and are combined in line 36 with 4,730 lbs./hr. of water containing 14 lbs./hr. of free carbon soot withdrawn from the bottom of quench tank 73 by way of line 99, heat exchanger 70, and line 100.

Periodically to prevent buildup, ash is removed from the bottom of quench zone 73 by way of line 101, valve 102, and line 103 and sent to a metals recovery zone not shown, as previously described. Where it is desired to mix the product gas from oil-fired generator 64 with the product gas from petroleum coke-fired generator 12, the function of gas water separators 24 and 96 may be combined. In such instances, the exit streams of product gas plus water from venturi mixers 65 and 21 will discharge into a common gas-water separator, not shown. The mixed product gases will then be taken off the top of the gas-water separator, and a stream of water plus entrained carbon particles will be discharged from the bottom of the common gas-water separator into sedimentation vessel 37.

An analysis of the solids-free product gas stream from each generator is shown in table I; and the performance data for each generator is shown in table II.

TABLE I

Analysis of Product Gas Streams

| Component, Mole % (Dry Basis) | Petroleum Coke-Fired Line 26 | Oil-Fired Line 97 |
| --- | --- | --- |
| Hydrogen | 31.90 | 46.37 |
| Carbon Monoxide | 45.83 | 45.35 |
| Carbon Dioxide | 21.07 | 7.07 |
| Methane | 0.05 | 0.84 |
| Hydrogen Sulfide | 0.25 | 0.23 |
| Nitrogen | 0.80 | 0.04 |
| Argon | 0.10 | 0.08 |

TABLE II

Performance Data

| | Petroleum Coke-Fired Generator 12 | Oil-Fired Generator 64 |
| --- | --- | --- |
| Oxygen/Fuel Ratio, SCF/lb. | 13.68 | 11.76 |
| Oxygen/Carbon Ratio, Atom/Atom | 0.967 | 0.84 |
| Specific Oxygen Consumption, SCF/MSCF $H_2$+CO | 436.2 | 253.61 |
| Residence Time, Seconds | 6.14 | 4.96 |
| Generator Temperature, °F. | 2,450 | 2,419 |
| Generator Pressure, p.s.i.g. | 350 | 1,015 |

EXAMPLE II

This example illustrates how the settling rate and solids concentration of a carbon soot-water dispersion may be increased by the addition of particulate petroleum coke.

A 100 cubic centimeter (cc.) sample of quench water from the quench tank of an oil-fired synthesis gas generator, such as from quench tank 73 in example I, containing about 1 weight percent of free carbon soot settles slowly by gravity with a compression point at about 70 cc. after many hours of settling time. A 100 cc. sample of water containing about 1 weight percent of particulate petroleum coke made by the delayed coking process and having a particle size of 325 mesh (American Standard Sieve Size) is prepared and a 50 cc. portion is mixed with a 50 cc. sample of the aforesaid dispersion of free carbon soot in water. Within less than 15 minutes the mixed free carbon soot and particulate petroleum coke settles to a thickened slurry with a compression point of about 30 cc.

The process of the invention has been described generally and by examples with reference to reaction feedstreams of particular compositions for purpose of clarity and illustration only. It will be apparent to those skilled in the art from the foregoing that various modifications of the process and materials disclosed herein can be made without departure from the spirit of the invention.

We claim:

1. In the partial oxidation process for producing synthesis gas by reacting a liquid hydrocarbon fuel with steam and an oxygen rich gas at an autogenous temperature in the range of about 1,700° to 3,500° F. and a pressure in the range of about 1 to 350 atmospheres to produce, in the reaction zone of an unpacked noncatalytic synthesis gas generator, a gaseous effluent comprising substantially hydrogen and carbon monoxide and containing free carbon soot, the improvement for recovering said carbon soot which comprises mixing said free carbon soot with particulate coke particles ranging in size from about 325 to 200 mesh U.S. Standard Sieve Size, and water to form an aqueous dispersion wherein a minimum of 0.10 parts by weight of particulate petroleum coke is mixed with each part by weight of free carbon soot.

2. The process as described in claim 1 wherein said dispersion of free carbon soot, particulate petroleum coke and water is formed by the steps of burning particulate petroleum coke as well as said liquid hydrocarbon fuel in the reaction zone of said synthesis gas generator thereby including in said gaseous effluent a mixture of particles of unconverted petroleum coke and free carbon soot; and contacting said gaseous effluent with water in a gas-liquid contacting zone to form said dispersion of free carbon soot and unconverted particulate petroleum coke in water.

3. The process as described in claim 1 wherein said dispersion of free carbon soot, particulate petroleum coke and water is formed by contacting the gaseous effluent from said synthesis gas generator with water in a gas-liquid contacting zone to form a dispersion of free carbon soot in water; reacting a slurry of petroleum coke with an oxygen rich gas in the reaction zone of a second unpacked noncatalytic synthesis gas generator at an autogenous temperature in the range of about 1,700° to 3,500° F. and at a pressure in the range of about 1 to 350 atmospheres to produce a gaseous effluent comprising substantially hydrogen and carbon monoxide and containing unconverted petroleum coke; contacting said gaseous effluent from said second synthesis gas generator with water in a gas-liquid contacting zone to form a dispersion of particulate petroleum coke in water; and mixing together said dispersion of particulate petroleum coke in water and said dispersion of free carbon soot in water.

4. The process of claim 2 wherein the ratio of particulate petroleum coke to free carbon soot in said dispersion is from about 0.5 to 5 parts by weight of particulate petroleum coke per part by weight of free carbon soot.

5. The process of claim 1 wherein the clear water separated from said dispersion is recycled to said gas-liquid contacting zone and the remainder of said dispersion is recycled to said synthesis gas generator as a portion of the feed.

6. The process of claim 2 wherein the particulate petroleum coke and the liquid hydrocarbon fuel burned in the reaction zone of said synthesis gas generator comprises a slurry of liquid hydrocarbon fuel and 1 to 60 weight percent of particulate petroleum coke.

7. The process of claim 3 wherein the clear water separated from said dispersion is recycled to said gas-liquid contacting zone, and the remainder of said dispersion is recycled to said second synthesis gas generator as a portion of the feed.

8. The process of claim 3 wherein the slurry of petroleum coke reacted in the reaction zone of said second unpacked synthesis gas generator comprises a slurry of water and 25 to 55 weight percent of particulate petroleum coke.

9. The process of claim 1 wherein said dispersion of free carbon soot, particulate petroleum coke and water is formed by mixing said free carbon soot with water to form a dispersion and introducing particulate petroleum coke into said dispersion.

* * * * *

UNITED STATES PATENT OFFICE
CERTIFICATE OF CORRECTION

Patent No. 3,620,700          Dated November 16, 1971

Inventor(s) W. Schlinger, W. Slater, R. Dille & J. Tassoney

It is certified that error appears in the above-identified patent and that said Letters Patent are hereby corrected as shown below:

Col. 1 line 63      change "produce" to --product--

Col. 4 line 75      change "zOnes" to --zones--

Col. 7 line 38      after "1,344 lbs./hr." insert

--of scrubbed synthesis gas and 3693 lbs./hr. of water are then passed through line 23 into a standard gas-liquid separator 24 where 3684 lbs./hr.--

Col. 10 line 56     change "Claim 1" to --Claim 2--

Signed and Sealed this twentieth Day of January 1976

[SEAL]

Attest:

RUTH C. MASON
*Attesting Officer*

C. MARSHALL DANN
*Commissioner of Patents and Trademarks*